Figure 6:
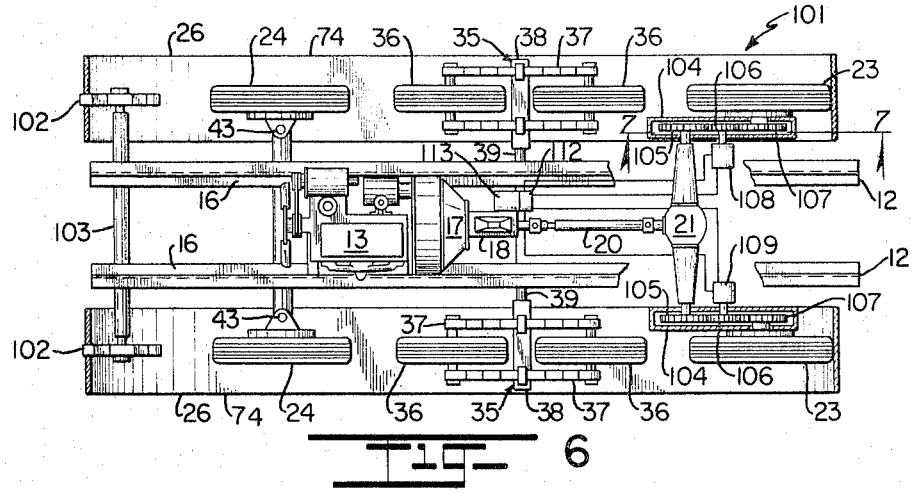

Jan. 3, 1967  C. B. MESSENGER  3,295,620
VEHICLE STEERING SYSTEMS
Filed March 2, 1964  3 Sheets-Sheet 1
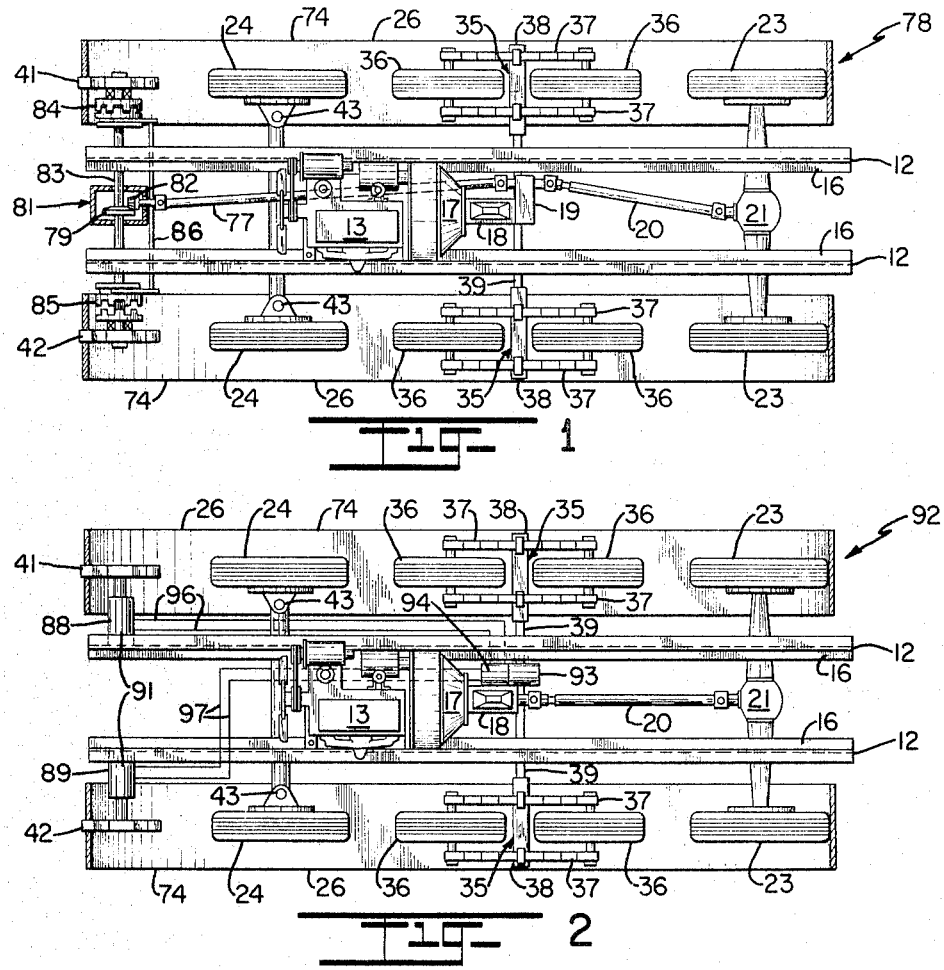
INVENTOR.
Charles B. Messenger
ATTORNEY

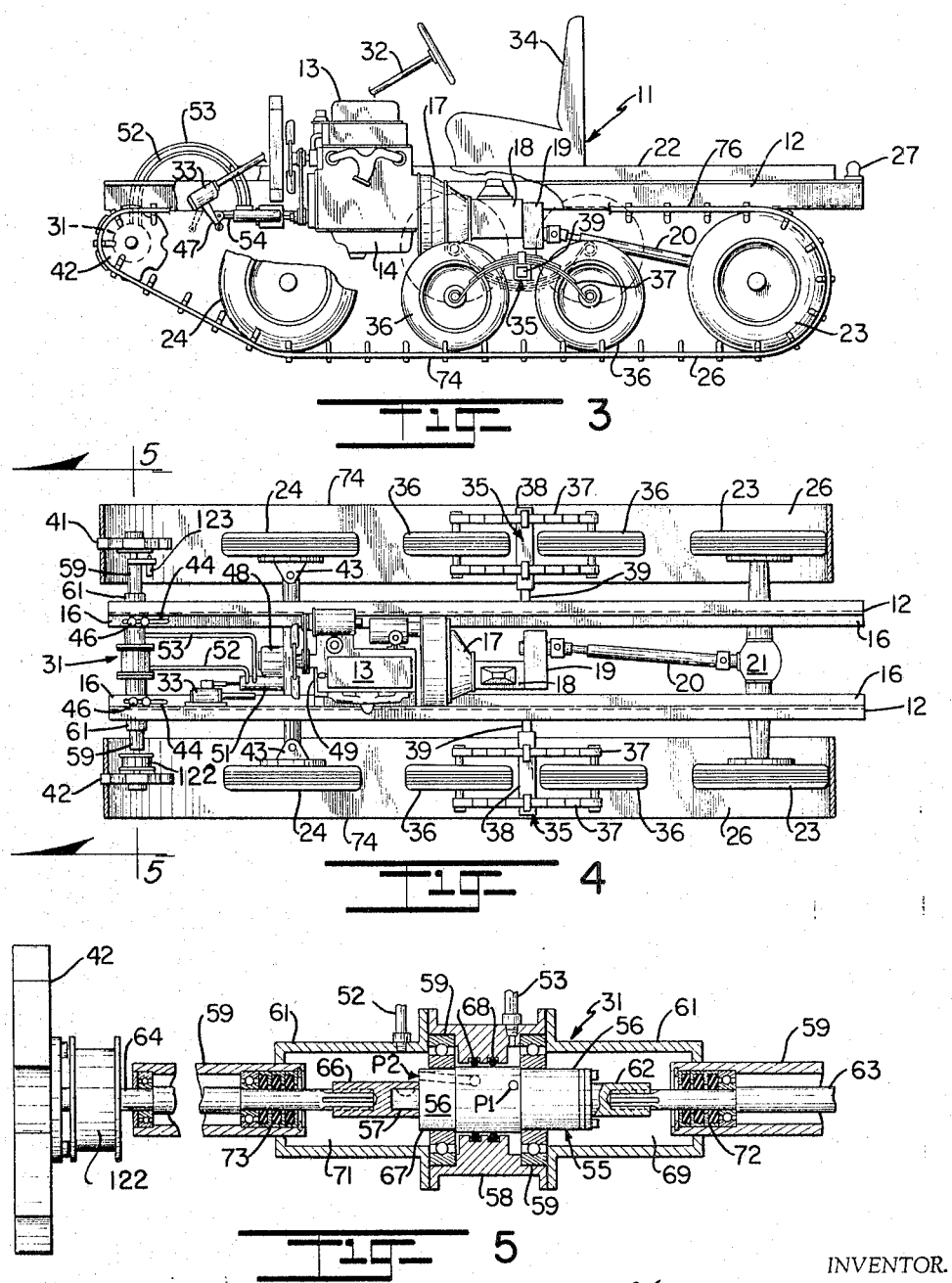

Jan. 3, 1967   C. B. MESSENGER   3,295,620
VEHICLE STEERING SYSTEMS
Filed March 2, 1964   3 Sheets-Sheet 3

INVENTOR.
Charles B. Messenger
ATTORNEY

United States Patent Office 3,295,620
Patented Jan. 3, 1967

3,295,620
VEHICLE STEERING SYSTEMS
Charles B. Messenger, 2440 Benton St.,
Denver, Colo. 80214
Filed Mar. 2, 1964, Ser. No. 348,370
16 Claims. (Cl. 180—6.7)

The present invention relates to the field of track vehicle steering and to the further general field of vehicle differentials and systems for the steering control of such differentials.

A further aspect of the invention is concerned with the provision of vehicles which are basically of a street or road type and which use normal drive components for such usage but which incorporate track type components, characteristics and capabilities. The invention further contemplates the provision of accessories for existing types of road vehicles so that such vehicles may be converted to selectively provide track laying vehicle performance.

It is recognized that many previous developments have been made in the general fields set forth. Accordingly, it is a main objective of this invention to provide improvements in this total field so that vehicles having multi-use capability can be provided in a more economical, efficient and effective manner.

A delineation of specific additional objectives can best be provided after review of some earlier developments together with further description of the present ideas and developments.

It is acknowledged that others have previously worked at the problem of mounting track systems on road type vehicles. The recognized advantages of making such an adaptation include several features in addition to the obvious desirability of obtaining the improved performance of a track system where difficult terrain conditions may be encountered. If wheeled vehicles or "road type" vehicles can be provided with a track capability, already extensive ranges of use can be expanded into additional difficult terrain off-the-road uses. The expanded field of use not only improves the operational capabilities of the vehicle, but it further could make it unnecessary for owners to keep and maintain two separate vehicles, at least one of which generally has a limited operational or seasonal use.

Others have also recognized the fact that the provision of a track system for vehicles built of essentially automotive type parts could probably decrease the total cost of such track vehicles, since the automotive parts are already in widespread manufacture and use. Recognizing such advantages, many earlier inventors have provided different and, at the time, novel approaches to the prospective desirable result.

Those who have previously attempted the use of conventional automotive differentials have, in general, tried to control such differentials for track steering purposes by the alternate application of brakes to the wheel systems of the separate tracks. While systems of this type have had widespread usage, certain disadvantages have been noted. The braking effort for control is considerable; accordingly, the maintenance of brakes is a recurrent problem. The actual track steering accomplished by such systems has in most instances been less than fully satisfactory, since the turn radius is from a practical standpoint excessive where conventional automotive brakes are used.

If a conventional automotive type differential is to be used in a track steering system it is desirable that some positive means be provided for varying the speed ratio of the separate differential output axles. It is acknowledged that others have recognized such problem and have developed mechanisms which answer the requirements better than the alternate braking type systems. Variator units in which variable speed pulley systems are interconnected by V drive belts are a current example of an effective differential control mechanism. A further system that might be used on track vehicles for the direct control of a differential to provide a set steering ratio is embodied in the developments of Borgward (Patent No. 2,332,838) and in similar developments by others. In this system, an alternate power train is provided from the engine or transmission to the axles of the differential. Selective engagement of such power train alternately to the right or left axle will cause that one of the differential axles to speed up, and, accordingly, the other of the drive axles must be slowed by the normal action of the side and spider gears in the differential. Significantly the alternate power train is connected only to one or the other of the vehicle axles at any time.

In all such known embodiments, such alternate power train is embodied within and associated directly with the differential construction. Further, it should be noted that this type of differential control is primarily suggested for use and is used on vehicles of the wheeled farm tractor type. Any usage for track steering is unknown. However, it is acknowledged that the system could be adapted for track steering purposes.

Operation by this inventor of alternate power train differential control systems for track steering purposes indicates that there are operational advantages inherent in selectively speeding up one drive axle as opposed to the braking of such axle. Less horse-power is required and the power used is applied to useful work rather than being dissipated as braking friction. For this reason, both the variator type control and the alternate power train type units are considered to be improvements over the earlier alternate braking system type developments.

Either of such systems would have to be initially embodied in a wheeled type vehicle configuration if such vehicle were to also be used as a track carrier. So far as is known, the alternate power train system has not been used on any automobile units of the passenger variety or on any truck vehicles. The variator system has been used for passenger automobiles, but such use is not widespread, and, accordingly, the cost of components is still relatively high.

On the premise that a more economical track vehicle can be built using standard automotive parts and on the further premise that an additional advantage would be maintained if the vehicle had an over-the-road wheel drive capability, an investigation and survey of all such current developments has been made.

As the result of such study, it is believed that the alternate power train type of differential control is best suited for use on an all-purpose vehicle.

With the foregoing additional background, specific objectives of the present invention may be set forth. Such specific objectives include the following:

A main object of this invention is to present vehicle configurations which are believed to satisfy the basic requirements necessary to provide track type capability for all-purpose vehicles at a lower cost and in which the performance characteristics are adequate to assure the satisfactory use of such vehicles on the road as wheeled vehicles or in off-the-road conditions as track vehicles.

One further main objective is satisfied by some of the vehicle embodiments illustrated and described herein. Such objective is the provision of an auxiliary attachment for conventional vehicles of presently existing types so that such vehicles may be provided with a track drive capability.

A specific object of this invention is to provide a track steering system in which the main drive for the track and vehicle is a conventional type automotive differential and in which steering and control of such differential and thereby of the track is obtained by the application of supplementary power to the track at a location remote from the differential for transmission by the vehicle track functioning additionally as a power transmission device to the drive wheel and through conventional operation of the differential to the opposite drive wheel and track.

Another object of this invention is to provide an alternate power train type of control for a differential as elements of a track steering system in which forces for the steering control of the conventional vehicle driving differential are transmitted by the vehicle carrying track functioning additionally as a power transmission device.

It is an object of this invention to provide a vehicle which may be used under on-the-road conditions as a wheeled vehicle or which may alternately be provided with a track system for off-the-road and difficult terrain conditions.

A further object is to provide novel track steering and vehicle suspension functions for such multi-use vehicles.

Another object of the invention is to provide a track system inclusive of track steering components that may be applied as attachments to conventional wheel type vehicles.

It is another object of the invention to provide track steering and track support components for road type wheeled vehicles in which the track steering components are separately useful as a windlass or winch.

Another object of this invention is to provide a basically wheel type vehicle which has increased operational capabilities through provision of a track system which may be used selectively or alternately on said vehicle.

A further object of this invention is to provide components for adapting conventional type road vehicles and/or existing wheeled road vehicles into track laying vehicles.

Another object of this invention is to provide novel track steering apparatus for track vehicles.

A further object of the invention is to provide track steering capabilities through use of auxiliary hydraulic, electrical or mechanical supplementary power sources that are applied to the vehicle carrying track functioning additionally as a power transmission device.

Another object of the invention is to provide a track steering apparatus for vehicles in which power is extracted from one track and is transmitted and applied to the opposite track for the operational and steering control of such vehicle.

Another object of the present invention is to provide a track steering system in which the steering control for at least two tracks is provided by a single motor control unit.

Another object is to provide apparatus of the foregoing type in which said single motor control unit is at all times connected to each of the separate tracks.

A further object is to provide a track steering system utilizing both the action and reaction forces of motor units.

Another object of the invention is to provide a track steering system for vehicles in which the action and reaction moments of a motor unit are applied to beneficially accelerate one drive member with the counter force being applied to slow down an associated drive member of such vehicle.

A further object of the invention is to provide a track steering system in which the design characteristics of separate components may be efficiently combined to provide wide range operation.

An object of this invention is to provide novel means for the control of automotive type differential drives.

Another object of this invention is to provide means whereby the relative speed of the opposite drive axles of a differential may be closely controlled with respect to each other and in which power flow to one specific drive axle may be supplemented at least in part by power derived from the other of said drive axles.

A further object is to provide a mechanism of the foregoing type in which a braking force applied to one drive axle is converted to a driving force to be added in supplementary manner to the other drive axle.

Another object of this invention is to incorporate means for accomplishment of the above stated purposes through provision of auxiliary drive units that may be coupled into a differential and wheel axle system efficiently irrespective of inherent differences in best speed ratios for such drive units and differential assemblies.

Another object of this invention is to provide a single motor control unit for use to vary the relative axle speeds of an automotive type differential.

A further associated object is to provide assemblies wherein the action and reaction moments of motor units may be coupled to elements of conventional automotive differentials for control for the output speeds and power flow characteristics of such differentials.

A further object and inherent benefit of this invention is to provide a mechanism wherein the operational characteristics of a differential may be controlled by a motor unit having an inherent speed and best power characteristic different from the speed and power characteristics of such differential.

A further object is to provide a control motor for differential units that is capable of controlling the vehicle turning characteristics of such differential through a wide range of vehicle speeds. An associated object is to provide a control unit for differential assemblies on vehicles that is capable of steering such vehicle through all types of operationally required turns.

Another object of this invention is to provide a steering control system for a track type vehicle that is adaptable for direct and selective coupling to steering components of a steered wheel type vehicle.

Further objects and advantages of the invention will be apparent from the appended description and drawings, in which.

Figures 7, 8:
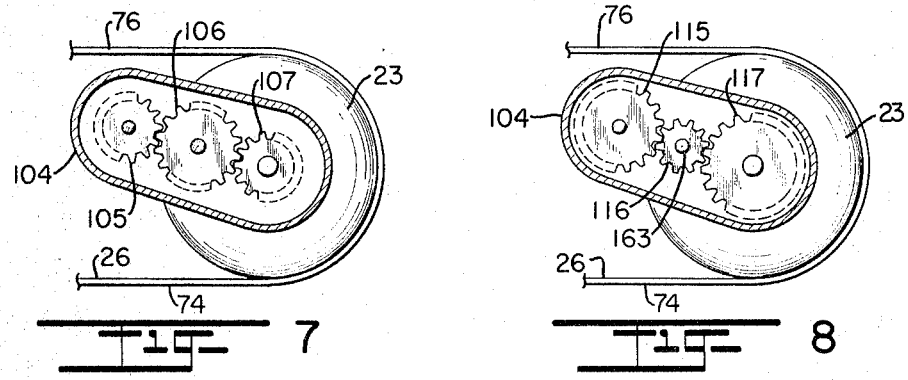
Figure 9:
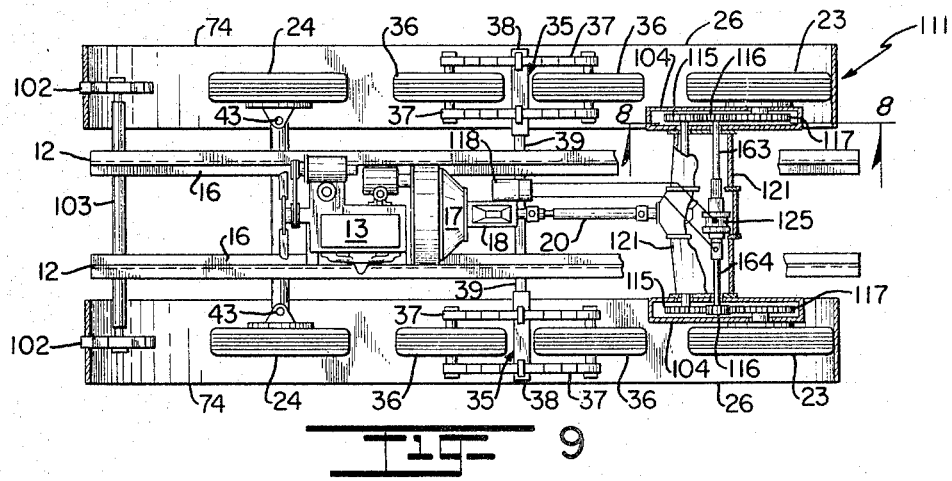

FIG. 1 is a top plan view in partial section illustrating use of a mechanical type alternate power train system, FIG. 2 is a top plan view in partial section showing use of separate driven motors for the control of a remotely located conventional type differential, FIG. 3 is a side elevation in partial section showing the general placement of components in a preferred embodiment of the invention, FIG. 4 is a top plan view of the embodiment shown in FIG. 3, FIG. 5 is a cross-sectional elevation taken along the line 5—5 of FIG. 4 and illustrating structural features of a single motor control unit, FIG. 6 is a top plan view in partial section illustrating the use of separate cross-connected motor/brake units for differential control, FIG. 7 is a cross-sectional elevation taken along the line 7—7 of FIG. 6 showing a gear reduction assembly for the FIG. 6 embodiment, FIG. 8 is a cross-sectional elevation taken along the line 8—8 of FIG. 9 showing a gear reduction assembly for the FIG. 9 embodiment, and FIG. 9 is a top plan view in partial cross-section showing the use of a single motor unit for the control of both axles of a differential assembly.

The present invention is primarily directed to the provision of track steering systems that are compatible with the conventional drive and steering components of road type wheeled vehicles. Inasmuch as the use of conventional automotive differentials is desirable in connection with the provision of a wheeled vehicle, all embodiments of this invention are concerned to a large extent with the provision of means for utilizing and controlling the power delivery of a conventional differential so that such differential can be used as a drive component of a track drive system.

A first specific feature of the invention is the utilization of the vehicle carrying track as a power transmission device for the control of such differentials. This feature of the invention is shown and incorporated in FIGURES 1 through 5. In these embodiments of the invention, the vehicle carrying track is used additionally as a power transmission component so that a control force or torque may be transmitted from an auxiliary steering control unit through the track to a drive wheel; thence by the associated axle back to the differential, and through such differential to the other drive axle and drive wheel. Instead of braking such drive wheel to steer the track and differential, torque at a higher effective r.p.m. than the effective r.p.m. of the differential drive wheel is applied to one track by the steering control unit. Such force will be transmitted by the track, and the speed of the associated drive wheel will be accelerated. By action of the differential the speed of the opposite drive wheel and associated track will be slowed, and, accordingly, a vehicle turn will be accomplished. The control or steering torque may be applied to the track in position remote from the drive wheel through use of a conventional drive cog, wheel or other element. The control torque applied at such point may be supplied by an electric or hydraulic motor or by the selective interconnection of a mechanical drive control unit system alternately connected to one or the other of the separate track control cogs through use of an intermediate clutch or drive connector.

In all presently submitted configurations of the invention the ultimate source of power for the control unit is the same vehicle drive engine which continues to provide a drive force (though perhaps of diminished value) through the conventional direct power train of the vehicle inclusive of transmission and differential units.

A second and related feature of the invention is involved in the cross coupling of separate control motors which are used as the steering control units to apply the control force to the differential. This cross coupling is in the present description illustrated by the use of hydraulic pump/motors at each of the track control drive units. A similar track steering result is obtainable through the use of electric motor/generator units or alternately through use of electric motor/brake units.

In the presently illustrated embodiments of this feature, as shown in FIGURES 2 and 6, units which will act as a hydraulic pump or motor are placed at each of the control unit positions. These units are interconnected in a hydraulic system, inclusive of a separate make-up pump, so that hydraulic fluid may be introduced or removed from either control unit when such unit is acting either as a pump or as a motor. Fluid introduced into such unit acting as a pump will be initially pressurized by track movement and power will be taken from such track. This initially pressurized fluid is next introduced to the make-up pump which is driven by the vehicle engine, and the fluid is further pressurized before being directed into the second track control unit which, acting as a motor, delivers power and effectively speeds up the said second track. The described cross coupling, accordingly, provides an increased drive or action force acting through the motorized control unit to speed the second track and a companion braking or reaction force delivered by the then pump control unit to slow the first track. The combined action-reaction forces are transmitted to the main drive differential for the even more effective control thereof. Since each of the control units are inherently pumps or motors depending upon the pressure and direction of fluid introduction and flow, the track vehicle may be steered in either direction through proper selection of hydraulic valve control flow components. Conventional circuit units used for such fluid flow control can be directly interconnected to conventional vehicle steering apparatus so that effective and efficient control of track steering is accomplished.

A third feature of the invention is primarily concerned with recognition of the fact that in every motor in which there is an action there is an inherent opposed reaction; and, with the application of such fact to the problems of track vehicle steering. Beneficially, this principle makes it possible to control a differential and to steer a track vehicle through use of a single control motor. The usefulness of such development, however, is not confined to a simple reduction in the number of motor control units.

In order to use the action-reaction forces of a single motor so that the action force of the motor may be delivered to a first track to increase the speed thereof and the reaction force may be delivered to a second track to provide a braking, it is necessary that the motor case as well as the armature or rotor be mounted for free rotation with respect to the vehicle frame. With both components mounted for independent rotation, the case can be associated with one track or drive and the rotor to the other for rotation at speeds determined by the associated track speed. On a straight ahead vehicle course, the rotor and case of the control unit will rotate freely in the same direction and at the same speed. If the vehicle is to be steered, a difference in the rotative speeds of the rotor and of the case must be established. Energization of the control unit motor will power such divergent movement of rotor and case.

A main advantage of the single control unit motor configuration resides in the fact that the control motor need only power the divergent component of relative track speeds. Analysis will show that a total divergent rotative speed capability of 200 r.p.m. is adequate for the steering of a track system where the normal rotative speed of the track drive components might run through the range of 0 to 800 r.p.m. Accordingly, the use of a single motor control unit and the action-reaction forces thereof makes it possible to accomplish track steering with a control motor having a more limited speed range than would be possible if two separate motor control units are to be used. Further, it is noted that the torque requirements necessary to effect track steering under the usual operating conditions are relatively the same over the full range of track vehicle usage. In either electric or hydraulic motor design a level torque output is usually efficiently obtained over a relatively limited speed range. Where a single control motor unit is used, a limited speed range is adequate for proper track steering.

In the hydraulic control motor design used in the embodiment shown in FIGURES 3, 4 and 5, the motor case is mounted on bearings, and one track control cog is connected to the case. The control cog for the other track is connected to the rotor. The hydraulic motor used is of a full reversing type. Accordingly, if hydraulic fluid under pressure is introduced through one port, the rotor will be rotated in a first direction; whereas, if hydraulic fluid is introduced through the other port, the rotor will tend to rotate in a reverse direction. With the motor case itself free to rotate and with the case and rotor already rotating in the direction of track movement, introduction of hydraulic fluid through the first port will cause a displacement between the rotor and case which adds speed to the rotor associated control cog, and the reaction force reacts against the case associated cog until the desired variance in rotative speeds is obtained. Introduction of hydraulic fluid under pressure in the opposite direction will cause the case to be rotated forwardly at an increased speed, since the rotor cannot ordinarily be turned backwardly against the inertial forces of the track, though the rotor's tendency to move in such opposite direction will establish a braking force against its associated track.

In addition to providing a track steering system in which the control forces are transmitted through the track to a main drive differential, this single motor type of control unit can likewise be directly coupled into a differential assembly so that the speed of the drive wheels themselves may be controlled. This configuration of the invention as shown in FIGURE 9 is adaptable to many additional uses besides track vehicle steering. A system for the separate control of vehicle drive wheels has application in the field of wheeled tractor type farm and construction vehicles.

Detailed embodiments of this invention are shown in the accompanying figures. The embodiment of the invention shown in FIGURES 3, 4 and 5 will be first described, since this embodiment not only incorporates most of the features of the invention but it further presents an illustration of the type of all-purpose vehicle which might be conveniently made and sold in keeping with such invention. While such embodiment illustrates a platform type vehicle especially adapted to military and other off-road uses, it should be understood that components and assemblies from such embodiment could with slight modifications be applied as attachments to presently existing types of wheeled vehicles to derive a track supported and fully controllable vehicle.

In the illustrated embodiment, a platform vehicle 11 having longitudinal Z frame members 12 is provided with an engine 13 and other drive components. The engine 13 is mounted between the upwardly opening Z frames 12 so that the engine, block and pan 14 extend substantially below the lower flange 16 of the Z frame members. With this lowered positioning of the engine, standard and conventional automotive drive components, inclusive of the clutch 17, transmission 18, transfer case 19, rear drive line 20 and a rear differential 21, may be used without modification. The lowered positioning further helps to maintain a low center of gravity for the all-purpose vehicle 11 even though all outwardly extending components of the bed frame 22 are positioned at a relatively high elevation as necessary to provide adequate clearance between the drive wheels 23, the front conventionally steered wheels 24 and the track 26.

In preferred configurations the vehicle bed 22, though not fully shown, will be of substantially rectangular shape extending from a position at the front of the steered wheels 24 toward the rear to a position just forward of the end limits of the Z members 12, and laterally from a position covering the full width of the track on one side to the outer limits of the other track. The rear extension of the frame 12 may with such arrangement be used for a tow hitch 27 while the forward portion of the Z frame may be used for the support of a steering control unit 31.

When the track 26 is not used, the vehicle 11 will be supported by the rear drive wheels 23 and the front steered wheels 24. The front steered wheels will ordinarily be free to pivot about the front king pins 43, and the steered wheels will be interconnected to the steering wheel 32 through the conventional worm steering gear unit 33 and other steering components, inclusive of lever arms, tie rods, etc. (not shown). A drive occupying the seat 34 will, accordingly, be able to drive and manipulate the vehicle during periods of on-road or wheeled usage. In general, the vehicle springing system may be of conventional nature, though preferably of a heavier duty construction, since the particular vehicle illustrated is intended for off-the-road usage as well as over-the-highway travel. Accordingly, the design provides a relatively high road clearance. Further, it should be noted that while a single drive axle or differential 21 is illustrated, the basic vehicle could be of a 4-wheel drive category. In such instance, the vehicle would have a high order of operational capability when used simply as a wheeled vehicle.

In order to obtain proper gear ratios and power for wheeled off-the-road and for track type uses, it is preferable that a two-speed transfer case 19 be provided. Such two-speed transfer case when coupled with either a three or four speed transmission 18 will provide a wide range of alternate gear combinations that will suitably power the vehicle when used over rough terrain and up steep grades whether the vehicle is being used in the wheel configuration or as a track vehicle. If extensive use as a wheeled vehicle is intended, it would probably be preferable to provide a front drive axle which may in conventional manner likewise be connected into the transfer case 19 to provide four wheel drive.

The mentioned illustrations are, of course, representative of the alternate track vehicle configuration. When the vehicle 11 is to be used for on-the-road or wheel uses, the center bogie wheels 36, which are supported by leaf spring assemblies 37, will be removed or will be moved to an alternate position as shown by the dotted line representation. Removal or alternate positioning of the bogie wheel assembly 35 is quite easily accomplished, since the outer mount tube 38 is designed for close but reciprocally movable engagement on the support bar 39. In the alternate position the bogie wheel assembly 35 will be inverted, and the bogie wheels 36 will be positioned up under the bed frame 22 for engagement with the bed frame 22 if desired to minimize side sway.

The front control unit 31, inclusive of the respective associated drive cogs 41 and 42, may likewise be removed from the platform vehicle 11 or it may be left in position on the Z frame 12 as illustrated. If periodic alternate use as a wheeled or track vehicle is expected, the control unit assembly 31 will undoubtedly be left in place and permanently connected to the hydraulic components. If left in place during periods of use as a wheeled vehicle, the control unit shown in FIGURES 4 and 5 can provide an advantageous function, inasmuch as the unit can be used as a winch or windlass if the wheeled vehicle becomes stuck.

When it is desired to convert the vehicle 11 to track usage, the front steered wheels 24 will be locked in neutral or straight forward position, and the track 26 will be engaged about the rear drive wheels 23, the front steered wheels 24 and their respective right or left drive cogs 41 and 42. The bogie wheel assembly 35 will, of course, be reinstalled and positioned as shown in FIGURE 3. Where a hydraulic control unit 31 is used, the longitudinal positioning of such control unit may be adjusted along the length of the Z frame 12 through provision of elongated slots 44 in the Z frame 12 until the proper track tension has been attained. Thereafter, the adjusting bolts 46 may be tightened to hold the control unit in proper position. The bogie assembly 35, of course, holds the bogie wheels 36 in constant contact with the track through action of the springs 37 so that the track 26 will be held in proper ground contact as necessary to avoid loss of such track. When the tracks are installed, the steering wheel 32 and worm gear 33 will be disconnected from the conventional steering elements associated with the front steered wheels 24, and thereafter movement of the actuator arm 47 and the worm gear 33 will be used for actuation of the steering control unit 31.

In the present embodiment, steering control is effected through use of a hydraulic system. A hydraulic pump 48 of such system is directly connected to the front crank shaft extension 49 of the engine 13. The pump 48 is flow connected to a hydraulic control valve 51 so that hydraulic fluid under pressure will be delivered to the control valve 51, and return fluid from the system will be redirected to the pump 48 or to hydraulic reservoir (not shown). Flow lines 52 and 53 interconnect the hydraulic control valve 51 and the steering control unit 31.

As the actuator rod 54 is moved inwardly and outwardly by movement of the actuator arm 47, the hydraulic control valve 51 will establish a flow pattern through the lines 52 and 53 as necessary to increase or decrease the respective rotative speeds for the right and left drive cogs 41 and 42. Essentially, the control valve 51 may be of a four-way type so that when pressure is introduced through the line 52, a return flow of hydraulic fluid will be possible through the line 53. When steering control in an opposite direction is required, the line 53 will be pressurized, and the line 52 will carry the return flow from the motor of the steering control unit 31.

The operation of the motor/control unit 31 will be best understood from analysis of the representation presented in FIGURE 5. Here it will be seen that a hydraulic motor 55 having a case 56 and a rotor 57 is mounted within a cylindrical center support 58 by bearings 59. The case of the motor is, accordingly, free to rotate with respect to the center support 58 or any of the other support elements of the control unit. Such support elements include the outer tubes 59 and the inner support tubes 61. As illustrated, the case 56 is joined by means of a flange receptacle 62 to the right steering axle 63 so that rotation of the case 56 will cause rotation of the right drive cog 41. The rotor 57 of the hydraulic motor 55 is joined to the left steering axle by a collar 66. With this assembly, it is apparent that either the left or the right steering axle is free to rotate independently of the support elements of the control unit 31, and, accordingly, they are likewise free to rotate independently of the vehicle frame 12.

Since the right and left drive cogs 41 and 42 are in engagement with the track 26, these drive cogs will have a tendency to rotate with the track. Accordingly, when the drive power of the vehicle is being transmitted from the engine through the transmission and transfer case to the rear differential 21, the case and rotor 56 and 57 of the hydraulic control motor 55 will both rotate at speeds determined by the relative left and right track speeds as driven by the rear differential. When the vehicle is moving straight ahead, the rotor and case will rotate in a forward direction at equal speeds, and there will be no relative motion between the case and the rotor. During normal operations of the type of vehicle illustrated, this free rotation of case and rotor can vary over a range of from 0 to approximately 800 r.p.m. as the vehicle moves from stopped position to a ground speed of perhaps 45 miles per hour. When steering control is desired, it is necessary to establish divergent movement between the rotor and case elements of the control motor 55.

As previously set forth, however, analysis of required steering functions for track vehicles indicates that a relatively lower order of divergent rotational speeds is required to execute desired track vehicle turns. If a vehicle is moving along at a slow speed, tight operational turns may be required. If the vehicle moves at a relatively high rate of speed, as it might when traveling along a highway, the required turns have a greater radius. The same differential in relative track speeds which will provide a tight turn at low speed will also make it possible to execute a large radius turn at high speed. The fact that a relatively low and constant divergent speed capability is required makes it possible to use a motor having a limited speed range for the control of track steering on a vehicle in which the ground or track speed capability is much greater. The present design configuration which makes use of a control motor having a limited speed range is considered to be of prime importance in connection with the presently described embodiment. The limited speed requirements for the control motor make it possible to provide a motor having improved torque characteristics over such limited range, and such fact is true whether the control motor is of hydraulic or electric design.

In order to obtain the desired divergent rotational movement of rotor and case 57 and 56 for a hydraulic motor 55 of full reversing design, it is only necessary to introduce hydraulic fluid under pressure in alternate directions into the interior of such motor 55 for flow therethrough in alternate directions. The elements for the desirable counter-flow introduction of hydraulic fluid through the motor 55 and the means for confining such flow to the operative motor passages are illustrated in FIGURE 5. The hydraulic motor 55 illustrated is of the Orbit motor type as made by the Char-Lynn Company, of Minneapolis, Minnesota. In a prototype installation, a Model M208 Orbit motor has been used. This motor was modified by removing the inlet and outlet port boss and by reducing the case to a cylindrical shape so that the bearings 59 might be fitted to the exterior of such case. The flow ports were also moved so that a longitudinal displacement of such ports might be obtained. As illustrated, a first port P1 was opened through the outer barrel surface of the case 56, while a second port P2 passes through the flat end surface 67 of the case 56 adjacent to the rotor stub 57. Cross-flow between the flow lines 52 and 53 along passages exterior to the case 56 is restricted by use of O rings 68 or other type of rotating hydraulic seal. With this arrangement, all communication between the flow lines 52 and 53 must be through the operative internal passages of the motor 55. Teflon O rings 68 have given good service when used about the case 56, since a minor amount of leakage along this exterior path is not operationally objectionable. With proper design and with a wide longitudinal separation between the flow ports P1 and P2, other types of rotating seals can be used to give long service and minimum leakage.

When fluid under pressure is introduced through the flow line 53, the entire chamber 69 surrounding the flange receptacle 62 will be pressurized. In similar manner, presure flow through the flow line 52 will cause oil in the chamber 71 to be pressurized. In order to prevent loss of the hydraulic fluid or oil out of such chambers, the innermost ends of the steering axles 63 and 64 are provided with rotary oil seals 72 and 73. Since these seals surround a smooth surface on the axles 63 and 64 and since the axles are of relatively smaller diameter than the case 56, a lower wiping speed makes use of economical type rotary oil seals possible.

For purposes of description, it may be assumed that when the flow line 52 is pressurized, flow introduction will be through the port P2, and the rotor 57 will be caused to rotate in the forwardly moving direction. The same force derived from the pressure flow which tends to speed up the rotor 57, the steering axle 64 and the associated left drive cog 42 will react in opposite rotary direction against the case 56. This reaction force transmitted by the receptacle 62 and steering axle 63 to the right drive cog 41 will tend to slow such drive cog and its associated right track. If the vehicle is standing still, this divergent movement of the rotor and case will cause the right track to move rearwardly to execute a shadow or spot turn. If the vehicle is already being moved forwardly by power delivered through the drive line 20, the reaction against the case and the right drive cog 41 will actually work more in the nature of a braking force which tends to slow the right track at the same time that the left track is being speeded up.

Regulation of the fluid flow through the hydraulic system makes it possible to accomplish regulated turns in the desired direction. It should be noted, of course, that if the flow line 53 is pressurized, the case 56 will rotate in a forward direction and the right track will be speeded up and the left track will be slowed or reversed by the reaction force acting against the rotor 57. In such flow pattern the return flow to the control valve 51 will be delivered through the flow line 52.

An analysis of the manner in which the driving forces and the control forces are applied will indicate a further advantage of this present system. When steering control is being exerted by the control motor 55, the torque tending to speed up the desired track is transmitted by the top flight 76 of the tracks 26. Since this top flight 76 is out of contact with the ground, the top flight can act efficiently as a power transmission device, and the torque transmitted will be applied directly to the circumference of the associated rear drive wheel 23 to decrease the total torque necessary to rotate such drive wheel insofar as the differential 21 is concerned. With this reduction in total torque, the differential itself will have a tendency to speed up that particular drive wheel, and the torque distribution through the differential will become unbalanced in a desired direction. This natural tendency of a differential assembly to cause an unloaded wheel to spin is with this invention used to great advantage. As previously stated, it is believed that the force required to speed up one-half of a differential is considerably less than the force that would need to be applied to slow or brake one side of a differential assembly. When such force is also put to useful work rather than being dissipated as heat, the total efficiencies are likewise improved.

The illustrated configuration for a tracked vehicle in which control units are positioned at the front of the vehicle and the main drive force is applied at the rear of the vehicle has further advantages in addition to the fact that the controlling torque is transmitted by the top flight 76 of the track acting simply as a power transmission member. Where the main drive force for the vehicle is at the rear, the lower flight 74 of the track which is in contact with the ground is in tension when the vehicle is moving forwardly. It is the predominant opinion of those experienced in track vehicle design that a rear drive is preferable in track vehicles because of this fact that the lower flight is then kept in tension. Current track vehicle designs which use a rear drive often, however, incorporate a disadvantage inasmuch as a front track ramp is not easily provided on rear drive track vehicles. In the present configuration, where the control unit 31 is mounted at the front of the vehicle and in which the drive cogs 41 and 42 are of smaller diameter than the wheels and in position out of contact with the ground, a ramp front is provided. The ramp front, of course, makes it easier for the vehicle to contact and climb over obstructions and also prevents a tendency of rear drive track vehicles to "bulldoze" granular or loose materials, such as snow or sand, in front of a non-ramped track.

While the positive or forwardly moving steering force is transmitted by the top flight 76 of the track 26, the braking or reaction negative force exerted on the opposite track is transmitted by the lower flight 74. Operation of vehicles of the type shown has indicated that this negative force application likewise serves a useful purpose. In track vehicle operation, when the tracks are being run over pneumatic tires, or in any track vehicle design, the problem of avoiding loss of the tracks is important. Operators further recognize the fact that tracks are most often lost when turns are being executed, and usually the tracks will be lost off the track disposed toward the inside of the turn. Maximum side loadings occur at such time. In previous track steering systems, track tension along the lower flight is also reduced on the inside track when a turn is being made. These factors taken together materially contribute to track loss.

With proper design of the present vehicle, the problem can be minimized since a torque force can still be applied by the rear drive wheel 23 on even the inside track. This force will tend to keep the rear portion of the lower flight 74 in tension. At the same time a negative force is exerted at the front of the inside track of the vehicle by the reaction force of the control steering mechanism, and this force also tends to tension the lower flight of the track. With the lower flight of the track maintained in tension at both the front and rear of the vehicle, tendencies to throw the track are minimized.

From a technical and analytical standpoint, the use of a single control unit motor and the proper application of the action and reaction forces of such motor presents an interesting solution to the problems of vehicle steering.

Though many have previously recognized the possible advantage in deriving a mathematical expression for the combination of forces acting on a vehicle and the separate tracks of such vehicle during a complete turning maneuver, no full equation has been derived. The difficulty in presenting a mathematical statement results from the complex nature of the variables involved and in the instantaneous changes observable in such variables throughout the full period of turn execution. A recognized authority on vehicle mobility, Mr. M. G. Bekker, in his treatise on The Theory of Land Locomotion, has acknowledged that a full statement would involve the complex instantaneous integration of several variables. Equations set forth in this reference, however, indicate that analysis is best made of the forces acting on each of the separate tracks.

A major component of the forces acting on one track as opposed to those acting on the other are the turning moments which tend to move segments of the tracks radially toward or away from the center of the vehicle turn. It would seem from such analysis that if these turning moments could be varied or balanced one with respect to the other as necessary to follow a desired path of curvature, a most efficient turn could be accomplished.

The presently described mechanism is submitted as a practical solution to such problem. The desired turning path can be established by the fluid control valving, and such path can be maintained through use of a servo control with feed-back type of system. With the desired turning path established, the action and reaction forces of the single steering control motor will establish the most efficient work (or force times distance) pattern that will provide the required divergent movement for the tracks while executing the prescribed turn. The turning moments for the tracks will automatically be balanced in a manner to assure the most efficient mode of turn execution. Compensation for all the ground effects variables will likewise be provided by the action-reaction force times distance balance exerted by the single motor control unit. The tracks will individually be either slowed or speeded up to obtain the required divergence of track speeds as necessary for turn accomplishment depending on which type of movement control represents the least total work for the control motor.

Because it can provide track steering with minimum power expenditure, the single motor control unit configuration together with a proper servo system could itself be regarded as an integration mechanism fully capable of providing operational and efficient solutions to track vehicle steering problems.

An additional operational advantage of the present embodiment of the invention resides in the prospective and potential use of the unit as a winch or windlass as previously mentioned. For such usage, a drum 122 can be affixed to one of the steering axles 64, and a lock 123 can be provided on a support 59 or on the frame 12 for engagement with the opposed cog 41. When the lock is engaged, the case 56 of the control unit motor 55 will be kept from rotating, and, accordingly, the drum 122 may then be rotated in forward or reverse direction through use of the steering motor control valve 51. A winch cable can either be reeved on the drum 122 or a line may be wrapped about such drum for use of the mechanism as a windlass.

Further embodiments of the invention are shown in FIGURES 1, 2 and 6 through 9. In the FIGURE 1 embodiment the desired track steering is obtained through a mechanical drive system which selectively adds power and torque to one track at a time at an increased relative rotative speed and at a point remote from the differential to effect steering control of such track and differential.

As in the previously described embodiment, this FIGURE 1 type of platform vehicle 78 is again provided with a Z frame 12 which supports the engine 13, clutch 17, transmission 18, transfer case 19, a drive line 20 and a conventional rear differential 21. The rear drive wheels 23 and the front steered wheels 24 will be of the same configuration as that previously described. In similar manner, the vehicle 78 may be provided with a bogie wheel assembly 35 mounted removably on a support bar 39.

The changed features in this embodiment of the invention include the provision of a front drive line 77 interconnecting the transfer case 19 and the forwardly disposed control unit 81. The control unit 81 includes a beveled gear set, inclusive of a ring gear 79 and pinion 82 having a higher speed ratio than that of the rear differential 21. Accordingly, when the forward drive line 77 is interconnected in the power train, a through axle 83 will be rotated at a speed greater than the rotational speed of the rear axles of the differential 21. This higher rotative speed actually should be of great enough difference to compensate for the difference in the diameters of the rear drive wheels 23 and the front steering control cogs 41 and 42 as well as to provide for an increment in track speed corresponding to a desired turning ratio. The increment, however, need not be as much as the full turning ratio, since any increment in speed applied to one track will cause a corresponding decrease in the speed of the other track through operation of the differential 21.

In the operation of this embodiment of the invention, selective clutches 84 and 85 are provided for alternate and selective interengagement between the through axle 83 and the steering cogs 41 or 42. While conventional friction type clutches may beneficially be used in this installation, dog type clutches have been illustrated which are reciprocally movable with respect to the through axle 83 for engagement or disengagement from the cog associated portion of such clutch elements. For the purposes of engagement, a shifting fork assembly 86 may be provided to alternately interconnect one or the other of said clutches 84 and 85. The shifting mechanism 86 may be interconnected to the vehicle steering wheel (not shown), or a separate steering bar may be connected thereto to move the shifting mechanism 86 reciprocally as desired.

In this mechanical drive configuration shown, when a drive connection is established through the clutch 84, the steering cog 41 will be caused to rotate at a speed that is relatively greater than the normal speed for the associated right track 26. The torque force delivered through the drive line 77 and the control unit 81 to the steering cog 41 will tend to increase the speed of the right track. As in the prior instance, the force will be transmitted through the top flight of the track to the right rear drive wheel 23 to decrease the effective torque load on the right rear axle. As the wheel speeds up, the action of the differential 21 will cause the left rear wheel to be slowed, and a track vehicle turn will result. Turns in the opposite direction are accomplished by reverse positioning of the shifting mechanism 86.

This type of system is particularly adapted for use on existing four-wheel drive vehicles. Further, it might conveniently be used on a special vehicle utilizing drive components from any of the existing four-wheel drive vehicles. In the illustrated embodiment, the forward drive line 77 is interconnected to the output of the transfer case 19, but it should be understood that drive power for the forward control unit 81 can be derived from power take-off locations normally provided on such vehicles. When interconnected into the power take-off, the front wheel drive capabilities of such vehicles could be preserved for activation when the vehicle is being used as a wheeled vehicle. Actually, four-wheel drive may be used together with the described steering system, but it has been noted through actual use of such configuration that the torque necessary to effect steering control is increased when it is necessary to overpower two differential assemblies. Usually, best operation as a track vehicle is obtained when the front drive assembly is disconnected, as by use of various types of free wheeling hub clutches.

Where the control unit drive line 77 is interconnected into the power take-off, track steering control may only be available in either high or low transfer case ratio where the power take-off is located at the input to the transfer case. A gear ratio for the front control unit 81 can be established that is intermediate the high and low total ratios through the transfer case. Such arrangement, however, will cause the steering to be reversed in high ratio, and the control unit will act essentially as a selective braking device. While turns may be made with this arrangement, it is not considered to be as desirable as the results obtained when the tracks are selectively speeded up to accomplish the desired turns.

Another embodiment of the invention is shown in FIGURE 2. In this embodiment the track steering is dependent upon the use of separate right and left control elements 88 and 89, which cooperatively make up a control unit 91. As in the previous embodiments of the invention, the vehicle design includes use of frame members 12, engine 13, clutch 17, transmission 18, drive line 20 and a conventional differential assembly 21. The positioning of the drive and steered wheels 23 and 24 are likewise the same as that previously described.

In the illustrated FIGURE 2 embodiment, no transfer case is provided, since it would be possible in this, and in all other configurations of the invention, to actually obtain a low enough gear ratio through use of a transmission alone. The steering control system for this embodiment of the invention, however, does include the provision of a source of auxiliary power. For a hydraulic system this source is a make-up pump 93, which is preferably driven by the engine 13 and which is directly associated with a flow control unit 94. In a hydraulic system it is desirable that the right and left control elements 88 and 89 each be of a pump/motor design so that each of such elements can selectively be used as a pump or as a motor depending upon the pressurization of hydraulic fluid being introduced. Hydraulic lines 96 and 97 interconnect the pump/motor elements 88 and 89, respectively, to the flow control unit 94. In operation, to obtain vehicle turns fluid is introduced into on control element 89 so that such pump/motor, which is rotating in a forward direction as driven by the left track, will operate as a pump. The fluid pressurized by such pump operation is next introduced to the inlet of the make-up pump 93 together with additional fluid as necessary from the tank supply or other source. The pressure and quantity flow of the fluid may be increased by operation of the make-up pump 93, and thereafter the fluid at desired operating pressure is delivered to the control element pump/motor 88 in such manner as to activate such unit as a motor to drive the right steering cog 41 at a relatively increased speed as necessary to speed the right track. As the right track speeds up, operation of the differential causes the left rear wheel and the associated left track to slow down. This tendency for the left wheel and track to slown down will, of course, be aided by the braking force derived from operation of the control element 89 acting as a pump.

In this system the prime purpose of the make-up pump 93 is actually to introduce additional fluid under pressure for delivery to the individual pump/motor which is then acting as a motor. This make-up flow delivery is required, since the motor will tend to increase its speed thereby requiring an additional flow of fluid to accommodate the increased motor displacement. The pump/motor unit, which is then acting as a pump, of course, turns at an ever decreasing speed and provides a decreased fluid flow. It is possible that the required make-up fluid could be supplied by an accumulator system, but a make-up pump installation would be preferred, since the make-up pump can provide an increased pressure as well as the required increased fluid flow.

The alternate action of the control units 88 and 89 as pumps or as motors simply requires alternation of the individually unit associated pressure delivery and return flow lines. Separate four-way valves interconnected in the lines 96 and 97 can accomplish this pressure reversal, while a further four-way valve can be used to selectively direct the super pressured fluid from the make-up pump 93 alternately to one or the other of the control elements 88 or 89 depending upon which of such units is being used as a motor. Return flow lines from the motor element will be connected through the same valves to the supply side of the pump unit.

While the make-up pump could ordinarily be of capacity substantially less than that for the pump/motor units due to the low proportionate speed differential between an inside and outside track, a larger make-up pump could be used in a system where both pump/motors were usable at the same time as motor units. When both control elements are simultaneously and selectively usable as motors, power may be advantageously applied to both units in order to carry through the usual step ratios of a transmission to eleminate frequent shifting and to operate the engine at best power.

The control element pump/motors used in the described embodiment will, of course, need to have a wide range speed capability, since the associated steering cogs 41 and 42 may have to rotate at speeds from zero up to approximately 800 r.p.m. This type of drive and steering combination likewise incorporates the advantageous track tension characteristics described in connection with the FIGURE 3 embodiment.

FIGURES 6 and 9 present embodiments of the invention which are derived from and closely associated with the FIGURE 2 and FIGURE 3 embodiments, respectively. In these embodiments of the invention, vehicle systems are described in which the control units are located at the differential rather than being remotely positioned at an opposite end of the track.

The FIGURE 6 embodiment uses separate control elements which in a hydraulic system would again be of the pump/motor type. The FIGURE 9 embodiment utilizes a single motor control unit similar to the control unit 31 described in the FIGURE 3 embodiment. Some specific advantages of these adapted configurations will be apparent from the respective drawings.

FIGURE 6 presents a vehicle 101 having rear drive wheels 23, steered wheels 24, frame 12, engine 13, clutch 17, transmission 18, drive line 20, and a conventional automotive type differential 21. The main differences between this vehicle embodiment and those previously described is the provision of front idler cogs 102 which are mounted on a cross support 103 with each of the idler cogs 102 being designed for free and independent rotation. The cross support and idler cogs simply provide a ramp front track and auxiliary means for tensioning the individual tracks. In practice the whole idler and support assembly could be dispensed with if other means is provided for adjustments in track tension. A further and significant difference in the assembly is the provision of gear drop boxes 104 at the outboard ends of the differential case. These drop boxes are affixed to the differential case, and drive gears 105 are connected to the separate axles of the differential. Intermediate gears 106 are disposed between drive gears 105 and the driven gears 107 which are joined to stub axles which rotate the drive wheels 23 of the vehicle. The intermediate gears 107 on opposite sides of the vehicle are connected to the rotor shafts of control elements 108 and 109.

These pump/motor elements 108 and 109 are connected in a hydraulic system similar to that of the FIGURE 2 embodiment. Such system includes a make-up pump 113 and a flow control unit 112. The operation of the system is comparable to that previously described wherein initially pressurized fluid from one control element acting as a pump is introduced through the make-up pump to the other control element acting as a motor. The motor unit tends to speed up its associated drive wheel 23 and the drive gear 105 for the axle of the differential on that side of the vehicle. If control element 109 is operating as a motor, the left rear drive wheel 23 will be speeded while the right rear drive wheel will be slowed down by the combined action of the differential and the braking force exerted by the pump action of element 108. This control of the differential will result in execution of vehicle turns.

A primary advantage of this adapted type of drive system is embodied in the fact that the relative sizes of the drive, driven and intermediate gears may be adjusted so that the necessary speed range for a hydraulic control element or for an electric motor control element can be obtained. A further advantage of this placement integral with the differential is that a vehicle embodying such modification could conveniently be used for farm tractor and industrial or construction vehicles. The fact that the differential itself could be steered would make execution of tight turns in farm fields or in confined spaces feasible. Since the drop box type construction and even the provision of auxiliary hydraulic pumps is common to farm tractors, this type modification could be easily made on many presently existing vehicles. An adaptation which would provide track laying capability for this type of vehicle could materially increase the operational capabilities for such vehicles.

FIGURE 9 illustrates a further integral type differential and control unit asembly. In this embodiment a vehicle 111 is provided which is of substantially the same configuration as the FIGURE 6 vehicle 101. Corresponding parts and assemblies of this vehicle have been given numbers comparable to those previously used and described. In this embodiment an integral differential-control unit has been given numeral 121; the drive gear is 115; the intermediate gear is 116; and the driven gear is 117. This embodiment utilizes a single motor control unit similar to the unit 31 used in FIGURE 3. The control motor is indicated by the numeral 125, and hydraulic pressure is provided by a pump 118. The differential itself is of conventional construction, inclusive of left and right drive axles which are connected to the drive gears 115. The control motor 125 may be positioned within the case of the differential 121. The motor 125 will be isolated within the case, however, so that opposite halves may be separately pressurized as necessary to direct the hydraulic fluid through the longitudinally spaced alternate ports. As in the FIGURE 3 embodiment, the case of the motor may be connected to the right steering axle 163 while the rotor of the motor 125 will be connected to the left steering axle 164. These axles are in turn connected to the intermediate gears 116 in the left and right drop cases 104. The operation of the control unit is similar to the described operation for the control unit 31 in the FIGURE 3 embodiment. Introduction of fluid under pressure in a first direction will cause one steering axle (such as the left steering axle 164) to be speeded up by reason of the action force of the motor 125. The right steering axle 163 attached to the motor case will be slowed by the reaction force of such motor, and the movement of the drive and driven gears in the respective drop cases will be changed accordingly. As the result, the left rear drive wheel will be speeded up while the right rear drive wheel is slowed by the combined action of the differential and the reaction force of the motor. With a track installed, a vehicle turn will be accomplished.

The integral differential-control unit configuration shown in this figure has additional benefits inasmuch as the drop case gears can again be sized to accommodate the drive capacity of the control unit motor. Where a gear reduction is used between the intermediate gear and either the drive or driven gears, the torque force exerted by the control motor for the control of the differential can be increased. A limiting factor would be attainment of an excessive wiping speed for the rotary seal disposed about the motor case and between the flow ports. Where hydraulic motors are used, this gear reduction would more readily permit use of gear or vane type motors. The same type of gear reduction could make use of electric motors highly feasible. Use of a single motor control unit in this type configuration can be quite advantageous inasmuch as the motor would still not have to have the same speed range as the required speed range for the drive wheels 23. Proper design of the drop cases and the gears therein can provide adaptations for the satisfactory use of many different motors of either hydraulic or electrical type.

If the proper gear ratios can be obtained with slight variations in gear sizes, it is possible to have all of the control unit components, inclusive of the necessary connecting gears, in a small volume package that would be mounted on or formed integral with the case for the central working parts of the differential itself. With this arrangement, the relatively long steering axles could be eliminated. This type of construction would lend itself well to swing type axle differentials used in connection with independently sprung drive wheels.

The integral differential-control unit type of embodiment has potential use possibilities in the field of tractor vehicles as well as in designs for military and civilian passenger or truck vehicles. A highly responsive and maneuverable steering system is possible when such configuration is used on either wheeled type or track vehicles. The design is well adapted for farm tractor or industrial towing tractors where short radius turns are necessary.

All embodiments of the invention have potential use for industrial and construction machinery as well as for on-the-road wheel vehicles or off-the-road track laying vehicles. The potential uses of a vehicle which can be readily changed from a wheel type drive and steer system to a track laying configuration are believed to be as numerous in the industrial and construction fields as in various types of military and farm usage. With such convertibility, multiple items of equipment would not have to be maintained to have both the higher operating and road speeds of wheeled equipment and the improved traction characteristics of track vehicles that are so useful in difficult soil and terrain conditions. These same conversion features which can contribute to logistic flexibility in the field of military vehicle design can represent important economic savings in civilian fields of endeavor.

While the embodiments described have all been concerned with a steering system for an individual vehicle, an important use for the development could be found in the field of bulk transportation in regions where poor traffic-ability conditions are encountered. Others have suggested the advisability of providing a train made up of a plurality of individual drive units. This train concept has recently led to increased investigation of articulated vehicles. The present development is well adapted for use in the design of articulated vehicles, and it is believed that a plurality of drive components made in accordance with this invention would make actual attainment of improved results possible in connection with the mass or bulk transportation train concept.

Observation of articulated vehicles has indicated that in most present designs where a single platform is supported by two track units, the turns made by such vehicles are often accomplished by the forced turning of the track units resulting in a continuous series of jerky movements. Where more than two units are used in a train, this uneven turning of track elements is even more pronounced. By analogy, it seems that a plurality of track units joined together in an articulated system are only able to simulate one of the turning functions of railroad carriage or trucks system in a railroad train. In a train the individual trucks for each platform are free to rotate about a vertical axis, and the trucks individually go around the railroad curve while the platform follows a course modified by the individual displacements of the trucks. In an articulated track system, this function is served, and, accordingly, turns can be made. So far as is known, however, there is nothing in present articulated vehicles or train concept configurations which will provide the same benefit in turning operations for track laying train systems as the tapered and flanged wheel used on the individual trucks of railroad equipment. Without the tapered wheel, a railroad car would make a curve in the same succession uneven jerky motions now observed in articulated track train configurations. The track steering systems of the present development could make it economically possible to guide each separate track along individual paths at speeds corresponding to that required for smooth curve negotiation. Individual track steering control could, of course, compensate for the difference in curve circumferences for the inside and outside tracks better than that now provided by the tapered wheels of a train axle. Tighter turns could be made with a smooth movement pattern.

The provision of means for economically steering each of the individual tracks of a multiple track drive component train system could make bulk or mass transportation more feasible across muskeg, swamp or desert terrains and across barren arctic snow fields.

While separate embodiments of the invention have been shown and described and while some potential uses of the invention have been suggested, it should be apparent that the invention is adaptable to various modification and changes. All such modifications and changes as come within the scope of the invention as presented in the hereunto appended claims are considered to be a part of this invention.

For the purpose of accuracy of expression in the following claims, the phrase "positive force" is considered to be any vehicle oriented or generated force which propells or moves or which tends to propel or move the vehicle or components of the vehicle in their normally intended or forward direction of travel. The phrase "negative force" is considered to be a generic term for vehicle oriented forces which resist or stop or tend to resist or stop movement of a vehicle or components of a vehicle from traveling in such normally intended direction of travel. "Negative force" terminology would include a simple braking effort. An "active negative force" is a "negative force" but having the additional characteristic of imparting or tending to impart movement to such vehicle or components of the vehicle in a direction opposite to the normal intended direction of such vehicle. Inasmuch as movement is implied in such definition, a "positive . . . force" is also to be considered as an "active" force.

An "active negative force" of lesser magnitude applied to a single track could stop or tend to slow the movement of such track. An "active negative force" of greater relative strength when measured against the other forces acting on such track or on a track system could make the track against which the "active negative force" is applied move in a reverse direction.

As a further necessary definition, when the phrase "out of contact with the . . . ground" is used to describe the positioning of a vehicle drive member or steering control member or cog, such phrase is used to designate a configuration in which the lowest extremity of such member is positioned where it ordinarily would not come into contact with the vehicle supporting ground even if the vehicle track system were removed. Such phrase is not intended to apply to drive components which are merely separted from contact with level ground terrain by the thickness of the track itself.

It should further be noted that in the claims all statements regarding steering or movement patterns for the vehicle are primarily related to movement in a preferred direction or course of travel for such vehicle. The described components should not be considered inoperative because they may not provide the same action or result when the vehicle is moving in an oposite direction. Any configuration which incorporates the features of this development whether in a most or least efficient manner is to be considered a part of this invention.

I claim:

1. In a track vehicle in which the main drive force for the vehicle is applied to the tracks by drive members positioned rearwardly of said tracks, an improvement for vehicle steering uses which comprises steering control members mounted for full rotational movement about the axis thereof and engaged with the tracks at the front of said tracks, and means for the selective and independent application of active negative force to the steering control member associated with the track that is on the inside of a desired vehicle turn whereby said track may be slowed to accomplish desired vehicle turns.

2. In a track vehicle in which the main drive force for the vehicle is applied to the tracks by main drive members disposed at selected positions along said tracks, an improvement for vehicle steering uses which comprises steering control members mounted for full rotational movement about the axis thereof and engaged with the tracks in position away from the main drive members, and means for the selective and independent application of active negative force to the steering control member associated with the track that is on the inside of a desired vehicle turn whereby said track may be slowed to accomplish desired vehicle turns.

3. In a track vehicle in which the main drive force for the vehicle is applied to the tracks by main drive members disposed at selected positions along said tracks, an improvement for vehicle steering uses which comprises steering control members mounted for full rotational movement about the axis thereof and engaged with the tracks in position away from the main drive members, and means for the selective application of active force to said steering control members whereby a divergent speed ratio is established between the tracks of said vehicle.

4. In a track vehicle in which the main drive force for the vehicle is applied to the tracks by main drive members disposed at selected positions along said tracks, an improvement for vehicle steering uses which comprises steering control members mounted for full rotational movement about the axis thereof and positioned out of contact with the vehicle supporting ground and engaged with said tracks in position away from the point of main drive force application, and means for the application of a positive steering force selectively to the separate steering control members whereby the control member associated with the track that is on the outside of a desired vehicle turn may be speeded up to accomplish such desired turn.

5. In a track vehicle in which the main drive force for the vehicle is applied to the tracks by main drive members disposed at selected positions along said tracks, an improvement for vehicle steering uses which comprises steering control members mounted for full rotational movement about the axis thereof and engaged with the tracks, means for the selective application of positive steering force to the control member associated with the track that is on the outside of a desired vehicle turn, and means for the selective application of negative force to the control member associated with the track that is on the inside of a desired vehicle turn whereby a divergent speed ratio for said inside and outside tracks is established for the accomplishment of vehicle turns.

6. In a track vehicle in which the main drive force for the vehicle is applied to the tracks by main drive members disposed at selected positions along said tracks, an improvement for vehicle steering uses which comprises steering control members mounted for full rotational movement about the axis thereof and engaged with the tracks, means for the selective application of positive steering force to the control member associated with the track that is on the outside of a desired vehicle turn, and means for the selective application of active negative force to the control member associated with the track that is on the inside of a desired vehicle turn whereby a divergent speed ratio for said inside and outside tracks is established for the accomplishment of vehicle turns.

7. A vehicle for on-the-road type usage as a wheeled carrier and/or for off-the-road or other usage as a track laying vehicle comprising a power unit, an automotive type differential assembly, drive components interconnecting said power unit and differential, drive members on said differential assembly for application of the main drive force for said vehicle in both the wheeled vehicle and track vehicle configurations, a track steering control unit disposed on said vehicle in position away from said differential and drive members, steering control members on said control unit, separate tracks for selective use on said vehicle and disposed for driven engagement with the separate drive members of said differential assembly and the steering control members of said control unit when the vehicle is to be used for track laying purposes, said steering control unit being inclusive of power means for exerting torque forces on said steering control members and the individual tracks associated therewith, and means for the selective distribution of said torque force whereby unbalanced torque forces are exerted by said control unit and control members on the individual tracks for transmission thereby to the differential assembly.

8. A vehicle adapted for usage as a track laying carrier comprising a power unit, an automotive type differential assembly, drive components interconnecting said power unit and differential, drive members on said differential assembly for application of the main drive force for said vehicle, a mechanically driven track steering control unit disposed on said vehicle in position away from said differential and drive members, steering control members on said control unit, separate tracks for selective use on said vehicle and disposed for driven engagement with the separate drive members of said differential assembly and the steering control members of said control unit when the vehicle is to be used for track laying purposes, clutch members operatively between said control unit and each of said steering control members for the selective transmission of torque force from said control unit to said control members and the individual tracks associated therewith whereby unbalanced torque forces are exerted by said control unit and control members of the individual tracks for transmission thereby to the differential assembly.

9. A vehicle adapted for usage as a track laying carrier comprising a power unit, an automotive type differential assembly, drive components interconnecting said power unit and differential, drive members on said differential assembly for application of the main drive force for said vehicle, a track steering control unit disposed on said vehicle in position away from said differential and drive members, steering control members on said control unit, separate tracks for selective use on said vehicle and disposed for driven engagement with the separate drive members of said differential assembly and the steering control members of said control unit when the vehicle is to be used for track laying purposes, said steering control unit being inclusive of power means for selectively exerting positive torque force on one of said steering control members and negative force on the other steering control member, and means for reversing said torque distribution whereby divergent speed ratios may be establishehd for the separate tracks of said vehicle for the accomplishment of the track vehicle turns.

10. A vehicle adapted for usage as a track laying carrier comprising a power unit, a differential assembly, drive components interconnecting said power unit and differential, drive members on said differential assembly for application of the main drive force for said vehicle, a track steering control unit disposed on said vehicle in position away from said differential and drive members, steering control members on said control unit, separate tracks for selective use on said vehicle and disposed for driven engagement with the separate drive members of said differential assembly and the steering control members of said control unit when the vehicle is to be used for track laying purposes, said steering control unit being inclusive of power means selectively operable as a motor for alternately exerting a positive torque force or a negative force on said control member, and means for reversing said torque distribution whereby divergent speed ratios may be established for the separate tracks of said vehicle for the accomplishment of track vehicle turns.

11. A vehicle adapted for usage as a track laying carrier comprising a power unit, a differential assembly, drive components interconnecting said power unit and differential, drive members on said differential assembly for application of the main drive force for said vehicle, a track steering control unit disposed on said vehicle in position away from said differential and drive members, steering control members on said control unit, separate tracks for selective use on said vehicle and disposed for driven engagement with the separate drive members of said differential assembly and the steering control members of said control unit when the vehicle is to be used for track laying purposes, a single motor inclusive of rotor and case each mounted for rotational movement in said steering control unit, means interconnecting the rotor of said motor to one steering control member, and means interconnecting the case of said motor to the other of said steering control members whereby the action-reaction forces of said motor may establish divergent speed ratios between said steering control members for the accomplishment of vehicle turns.

12. A mechanism for the control of differential assemblies comprising shafts for said differential extending outwardly therefrom, power transmission elements on each of said shafts, a single motor control unit inclusive of rotor and case each mounted for rotational movement, means interconnecting the rotor of said motor to the power transmission element of one shaft, means interconnecting the case of said motor to the power transmission element of the other of said shafts, and means for energizing and controlling the rotative movement of said motor whereby the action-reaction forces of said motor may establish a divergent speed ratio between the shafts of said differential for the control thereof.

13. In a vehicle for on-the-road type usage as a wheeled carrier and/or for off-the-road or other usage as a track laying vehicle having vehicle supporting and driving tracks and further inclusive of a power unit, and automotive type differential assembly, drive components interconnecting said power unit and differential, and drive members on said differential assembly for application of the main drive force for said vehicle in both the wheeled vehicle and track vehicle configurations, the improvements which comprise a track steering control unit disposed on said vehicle in position away from said differential and drive members useful when the vehicle is in the track configuration for steering said tracks by driving, said unit having rotative elements on said steering control unit for engaging said tracks when said vehicle is in the track configuration, power means for rotating said elements, and a cable drum on at least one rotative element whereby said steering control unit may be used as a winch and windlass.

14. In a vehicle inclusive of a power unit, at least two drive components for propelling said vehicle, and mechanism permitting differential rotational movement of said drive components for controlling the directional movement patterns of said vehicle, a control unit for regulation of the differential rotation of said drive components, a single motor inclusive of rotor and case each mounted for rotational movement in said control unit, means interconnecting the rotor of said motor to one vehicle drive component, means interconnecting the case of said motor to the other of said vehicle drive components, and means for energizing and controlling the rotative movement of said motor whereby the action-reaction forces of said motor may establish divergent rotational speeds for said vehicle drive components.

15. A control unit for vehicle differentials which have opposed shafts extending therefrom that may be operated at differential rotational speeds for controlling the directional movement patterns of said vehicle comprising a single motor inclusive of rotor and case both mounted for rotational movement in said control unit, means interconnecting the rotor of said motor to one differential shaft, means interconnecting the case of said motor to the other of said differential shafts, and means for energizing and controlling the rotative movement of said motor whereby the action-reaction forces of said motor may establish divergent rotational speeds for said differential shafts.

16. In a track laying vehicle having vehicle supporting and driving tracks and utilizing a differential and drive members for imparting primary vehicle propelling drive force to said tracks, an improvement for steering a vehicle being moved by said primary forces which comprises rotative means for the continuous or transitory application of supplementary positive forces to a selected track at a point remote from the differential and drive member for transmission by the track acting as a power transmission device to the drive member for the control of the differential.

References Cited by the Examiner

UNITED STATES PATENTS

| 1,715,503 | 6/1929 | James | 74—710.5 |
| 2,336,911 | 12/1943 | Zimmerman | 180—6.44 X |
| 2,742,262 | 4/1956 | Drawdy et al. | 254—139.1 X |
| 2,852,317 | 9/1958 | Riemerschmid | 180—6.7 |
| 2,990,900 | 7/1961 | Palsson | 180—6.7 X |
| 3,183,987 | 5/1965 | Trombley | 180—6.7 X |

BENJAMIN HERSH, *Primary Examiner.*

J. A. PEKAR, *Assistant Examiner.*